United States Patent
Kikuchi

(10) Patent No.: US 9,718,226 B2
(45) Date of Patent: Aug. 1, 2017

(54) METHOD OF INJECTION MOLDING

(71) Applicant: SUZUKI MOTOR CORPORATION, Hamamatsu-shi, Shizuoka (JP)

(72) Inventor: Kayo Kikuchi, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 349 days.

(21) Appl. No.: 14/627,129

(22) Filed: Feb. 20, 2015

(65) Prior Publication Data

US 2015/0158215 A1   Jun. 11, 2015

Related U.S. Application Data

(63) Continuation of application No. 13/433,772, filed on Mar. 29, 2012, now abandoned.

(30) Foreign Application Priority Data

Apr. 19, 2011 (JP) .................................. 2011-093362

(51) Int. Cl.
   *B29C 45/00* (2006.01)
(52) U.S. Cl.
   CPC ...... *B29C 45/0013* (2013.01); *B29C 45/0025* (2013.01); *B29C 2045/0015* (2013.01); *B29C 2045/0044* (2013.01)
(58) Field of Classification Search
   CPC ............ B29C 45/0013; B29C 45/0025; B29C 2045/0044
   See application file for complete search history.

(56) References Cited

U.S. PATENT DOCUMENTS

| 5,948,340 A | 9/1999 | Terada et al. |
| 6,251,326 B1 | 6/2001 | Siano et al. |
| 6,855,286 B2 | 2/2005 | Osawa et al. |

(Continued)

FOREIGN PATENT DOCUMENTS

| CN | 1110942 | 11/1995 |
| DE | 10 2010 014 487 | 10/2011 |

(Continued)

OTHER PUBLICATIONS

Chinese Office Action dated Mar. 4, 2014, from corresponding Chinese Application No. 201210117524.X.

(Continued)

*Primary Examiner* — James Sanders
(74) *Attorney, Agent, or Firm* — Troutman Sanders LLP

(57) ABSTRACT

A method for an injection molded product having a molten resin containing an aluminum pigment. The injection mold includes resin reservoirs connected to both sides of a cavity, positioned where the molten resin meets as it partly flows therein. The cavity has a design surface of an injection-molded product and both side surfaces continuing from the surface forming the design surface. One of the resin reservoirs is connected to one of the side surfaces and the other resin reservoir is connected to the other side surface, across the position where the molten resin meets. When the molten resin partly flows into the resin reservoirs, flow of the molten resin, which is substantially in parallel from the surface forming the design surface to the resin reservoirs, is generated and aluminum pigment makes an orientation angle of 120° to 140° on the design surface at the position where the molten resin meets.

6 Claims, 8 Drawing Sheets

(56) References Cited

U.S. PATENT DOCUMENTS

2003/0122281 A1 7/2003 Osawa et al.
2013/0069279 A1 3/2013 Busch et al.

FOREIGN PATENT DOCUMENTS

| EP | 0 879 687   | 11/1998 |
| -- | ----------- | ------- |
| EP | 1 312 455   | 5/2003  |
| JP | 2006-205580 | 8/2006  |
| JP | 2008-188855 | 8/2008  |
| JP | 2009-173025 | 8/2009  |
| JP | 2010-266064 | 11/2010 |

OTHER PUBLICATIONS

German Office Action dated Mar. 14, 2014, from corresponding German Application No. 102012103054.5.
Japanese Office Action dated Oct. 21, 2014, which issued during prosecution of Japanese Application No. 2011-093362, which corresponds to the present application.

FIG. 9

| | EXAMPLE1 | EXAMPLE2 | EXAMPLE3 | EXAMPLE4 | EXAMPLE5 | COMPARATIVE EXAMPLE1 | COMPARATIVE EXAMPLE2 | COMPARATIVE EXAMPLE3 | COMPARATIVE EXAMPLE4 | COMPARATIVE EXAMPLE5 |
|---|---|---|---|---|---|---|---|---|---|---|
| VOLUME OF RESIN RESERVOIR (cm³) | 0.2 | 0.6 | 23 | 0.6 | 0.6 | 0 | 0.1 | 0.6 | 0.6 | 0.6 |
| DISTANCE BETWEEN RESIN (mm) | 0 | 0 | 0 | 0.1 | 0.2 | - | 0 | 0.3 | 0.5 | 0.75 |
| ORIENTATION ANGLE θ OF ALUMINUM (DEGREE) | 125 | 140 | 140 | 125 | 120 | 0 | 105 | 115 | 115 | 110 |
| EVALUATION | ○ | ○ | ○ | ○ | ○ | × | × | × | × | × |

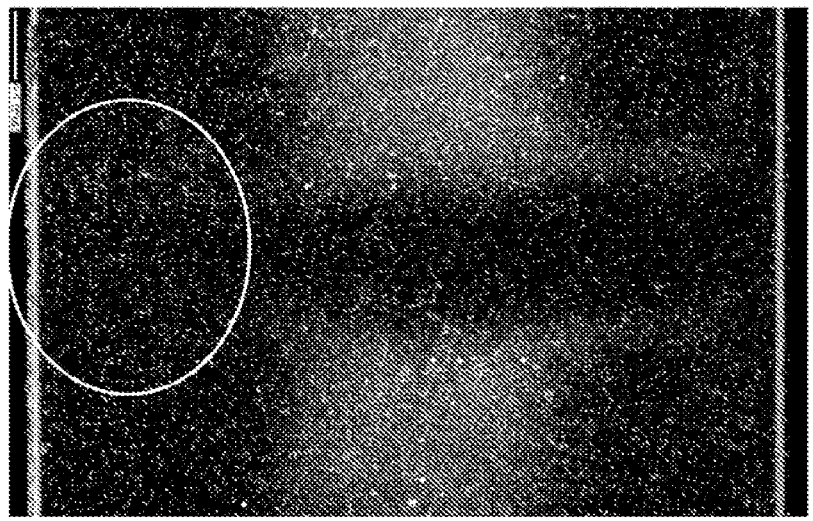
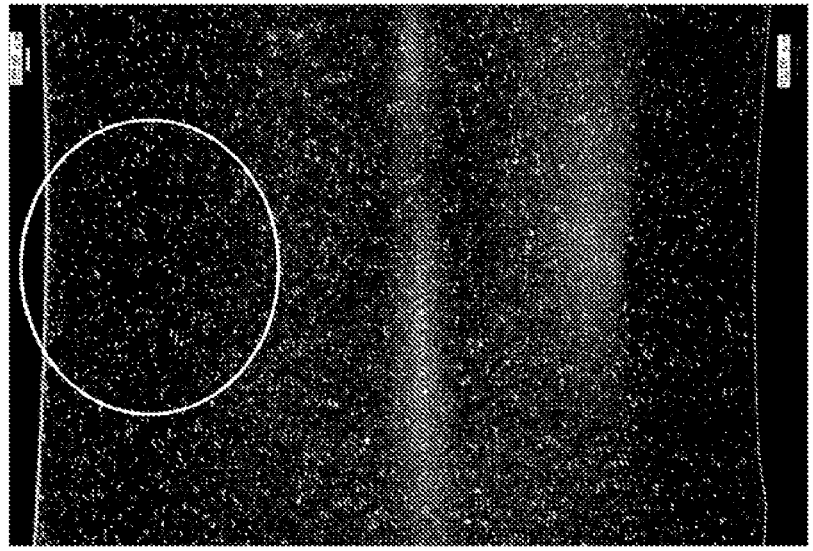

METHOD OF INJECTION MOLDING

CROSS-REFERENCE TO RELATED APPLICATIONS

This application is a Continuation of U.S. application Ser. No. 13/433,772, filed Mar. 29, 2012 which in turn is based upon and claims the benefit of priority of the prior Japanese Patent Application No. 2011-093362, filed on Apr. 19, 2011, the entire contents of both applications are incorporated herein by reference.

BACKGROUND OF THE INVENTION

Field of the Invention

The present invention relates to an injection mold in whose cavity molten resin meets.

Description of the Related Art

In resin car parts, the painting has been applied on many decorative parts corresponding to design parts. However, due to problems of a cost increase and the generation of VOC (Volatile Organic Compounds) caused by the painting step, the adoption of unpainted parts molded from colored materials that are resin materials directly colored with coloring agents such as pigments or dyes has been increasing year by year. Especially as car interior parts, resin parts with metallic color are often adopted, which has given rise to a demand for realizing a cost reduction of resin parts with a metallic tone by eliminating the painting.

In resin injection molding, leading ends of flows of molten resin are likely to become cold, and when they meet each other in a solidified state, defective welding occurs, leading to an appearance defect and strength reduction. A linear pattern generated by such meeting of the molten resin is called a weld line. When a hole shape or the like exists in a multi-point gate or a part, diffluence and confluence of the molten resin occur, leading to the generation of the weld line. Ordinary methods for correcting the weld line include a method of setting mold temperature or resin temperature high or setting injection speed high, thereby preventing leading ends of flows of molten resin from solidifying, but even by such a method, it is difficult to completely eliminate the weld line. Especially an unpainted resin part with a metallic tone using colored resin containing a luminous material has a problem that the orientation of the luminous material is disordered by the collision of the molten resin and as a result it loses a luminous feeling to appear black, so that the weld line becomes dark to be emphasized, leading to a serious appearance defect.

As a technique to solve this kind of problem, Patent Document 1, for instance, discloses a structure in which one of two resin flows running in opposite directions from a gate flows out to a resin reservoir before reaching a meeting part, in a cavity having a ring shape in a plane view. Patent Document 1 says that this structure increases a meeting angle of one and the other of the resin flows and can prevent the generation of a weld line.

[Patent Document 1] Japanese Laid-open Patent Publication No. 2008-188855

However, the method disclosed in Patent Document 1 cannot alleviate the disorder of the orientation of a luminous material when the two resin flows meet each other.

SUMMARY OF THE INVENTION

The present invention was made in consideration of the above problem and has an object to maintain a luminous feeling of a luminous material by alleviating the distortion of its orientation and make a weld line light and inconspicuous, in an injection mold in whose cavity molten resin meets.

An injection mold of the present invention is an injection mold in whose cavity molten resin meets, characterized in including resin reservoirs which are connected to the cavity on both sides of a position where the molten resin meets, and into which the molten resin partly flows.

Another characteristic of the injection mold of the present invention is that the cavity has a cross-sectional shape having a surface forming a design surface of an injection-molded product and both side surfaces continuing from the surface, and one of the resin reservoirs is connected to one of the side surfaces and the other resin reservoir is connected to the other side surface. In this case, the resin reservoirs may be connected to the side surfaces at positions apart from the surface.

Another characteristic of the injection mold of the present invention is that the cavity has a cross-sectional shape having a surface forming a design surface of an injection-molded product and a bottom surface continuing from the surface.

Another characteristic of the injection mold of the present invention is that the cavity has a ring shape in a plane view.

BRIEF DESCRIPTION OF DRAWINGS

FIG. 9 is a chart showing results of examples.

FIG. 10A is a view showing a photograph of a cross section.

FIG. 10B is a view showing a photograph of a cross section.

DETAILED DESCRIPTION OF THE PREFERRED EMBODIMENTS

Hereinafter, preferred embodiments of the present invention will be described with reference to the attached drawings.

Figure 1:
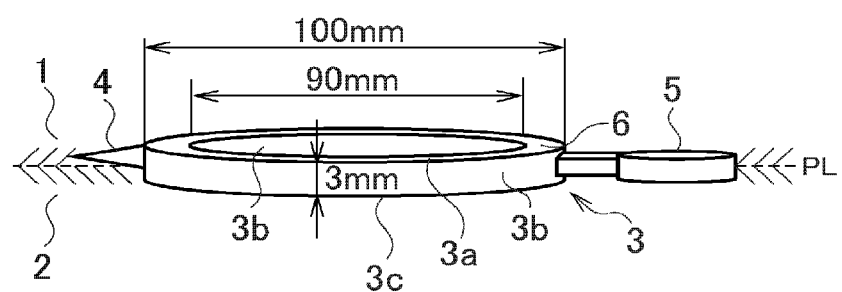
FIG. 1 is a perspective view showing a cavity of an injection mold according to this embodiment.
Figure 2:
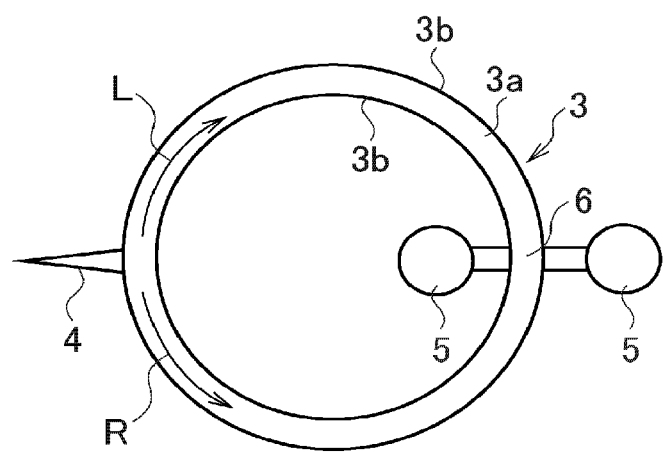
FIG. 2 is a plane view showing the cavity of the injection mold according to this embodiment.

FIG. 1 is a perspective view showing a cavity of an injection mold according to this embodiment, and FIG. 2 is a plane view thereof. As shown in FIG. 1, the injection mold includes a mold 1 (a movable side or a fixed side) and a mold 2 (the fixed side or the movable side), and when the injection mold is closed at a parting line PL, a cavity 3 being a space having a shape of an injection-molded product is formed. The cavity 3 has a ring shape in a plane view as shown in FIG. 2. Further, the cavity 3 has a rectangular cross-sectional shape having an upper surface 3a forming a design surface of the injection-molded product, both side surfaces 3b, 3b continuing from the upper surface 3a, and a bottom surface 3c.

In such an injection mold, thermoplastic molten resin containing a luminous material such as aluminum, mica, or Metashine is injected from a side gate 4 to fill the cavity 3, so that a ring-shaped resin part with a metallic tone is molded.

Figure 3A:
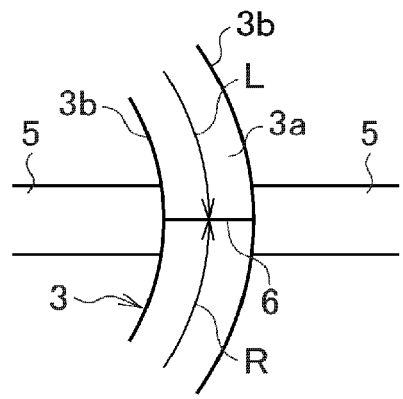
FIG. 3A is a view used to explain flows of molten resin at a meeting part of the injection mold according to this embodiment.

Here, as shown in FIG. 2, at a position opposite the side gate 4 in a diameter direction of the cavity 3, resin reservoirs 5, 5 are connected to the side surfaces 3b, 3b respectively. Note that in FIG. 1, the resin reservoir 5 on an inner side is not illustrated. When the molten resin is injected from the side gate 4, flows in opposite directions are generated in the cavity 3 as shown by arrows L, R in FIG. 2, and at the position opposite the side gate 4 in the diameter direction of the cavity 3, the molten resin meets (joins) (see FIG. 3A). Then, at the position where the molten resin meets (hereinafter, referred to as a meeting part 6), the molten resin partly flows into the resin reservoirs 5, 5 (see FIG. 3B and FIG. 3C).

Figure 4:
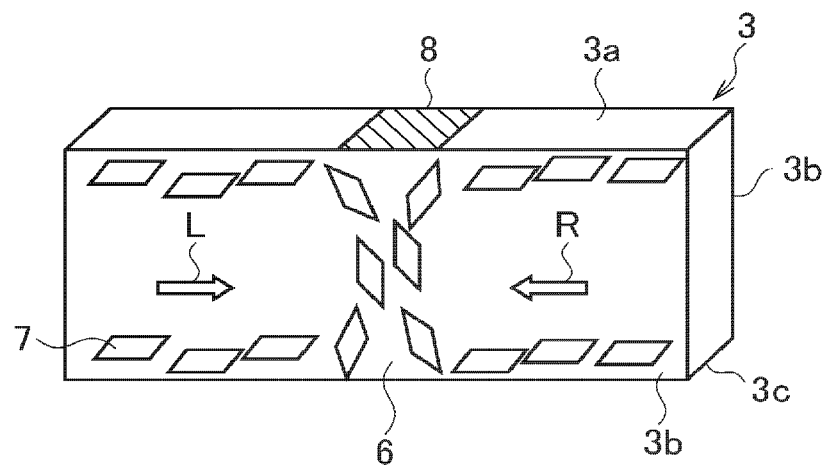
FIG. 4 is a view used to explain a reason why a weld line is generated.

FIG. 4 is a view used to explain a reason why a weld line is generated and shows a state of the vicinity of the meeting part 6. When the molten resin flows in the cavity 3, the flows near the mold surface become substantially parallel to the mold surface and the luminous material 7 contained in the molten resin is also oriented substantially in parallel to the mold surface. However, at the meeting part 6 where the molten resin meets, the orientation of the luminous material 7 is disordered by the collision of the molten resin, and as a result, it loses its luminous feeling to appear black, so that a weld line 8 becomes dark to be emphasized.

Figure 5:
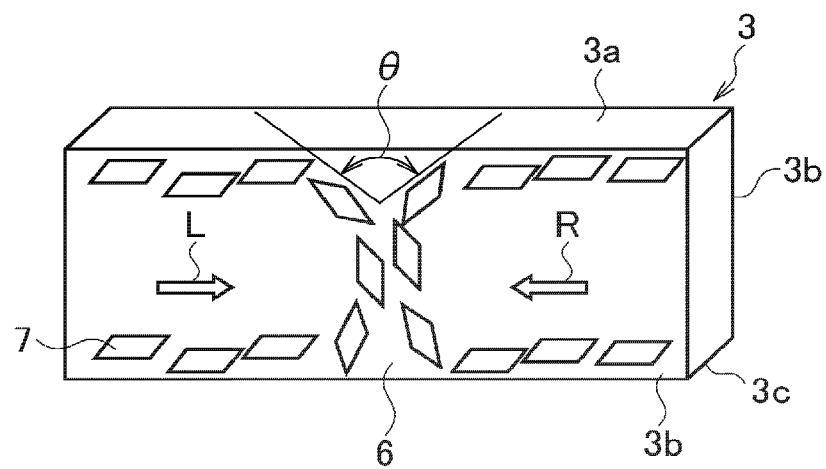
FIG. 5 is a view showing a state of the vicinity of the meeting part of the injection mold according to this embodiment.

In this embodiment, the resin reservoirs 5, 5 are connected to the cavity 3 on both sides of the meeting part 6. In this case, at the meeting part 6, the molten resin partly flows into the resin reservoirs 5, 5, so that flows horizontal to the upper surface 3a are generated as shown by arrows X in FIG. 3B and FIG. 3C, and accordingly, the luminous material 7 in these flows are also oriented substantially in parallel to the upper surface 3a. Therefore, as shown in FIG. 5, the disorder of the orientation of the luminous material 7 is alleviated, and it is possible to maintain the luminous feeling of the design surface of the injection-molded product and to make the weld line 8 light and inconspicuous, compared with a case without the resin reservoirs 5, 5.

Further, since the molten resin partly flows into the resin reservoirs 5, 5 at the meeting part 6, it is possible to suppress a pressure increase ascribable to the collision of the molten resin, which can prevent the resin from expanding when the molds 1, 2 are opened.

Further, since the molten resin partly flows into the resin reservoirs 5, 5 at the meeting part 6, solidified leading ends of the molten resin flow into the resin reservoirs 5, 5, which makes it possible to improve adhesion at the meeting part 6 and reduce strength reduction at the meeting part 6.

Figure 6:
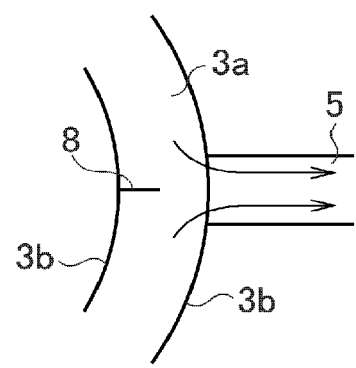
FIG. 6 is a view used to explain the flows of the molten resin at the meeting part when a resin reservoir is connected only to one side surface.

It should be noted that the resin reservoirs 5 need to be disposed on both sides of the meeting part 6. When the resin reservoir 5 is connected only to one of the side surfaces 3b as shown in FIG. 6, it is not possible to alleviate the disorder of the orientation of the luminous material 7 on the side surface where the resin reservoir is not connected, irrespective of a volume of the resin reservoir 5, and on this side surface, the dark weld line 8 is generated.

Figure 3B:
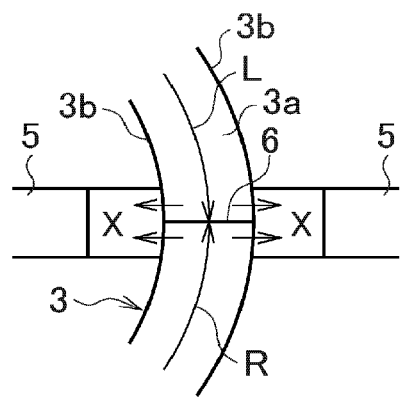
FIG. 3B is a view used to explain the flows of the molten resin at the meeting part of the injection mold according to this embodiment.
Figure 3C:
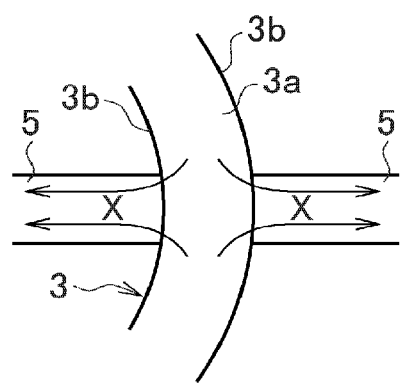
FIG. 3C is a view used to explain the flows of the molten resin at the meeting part of the injection mold according to this embodiment.
Figure 7A:
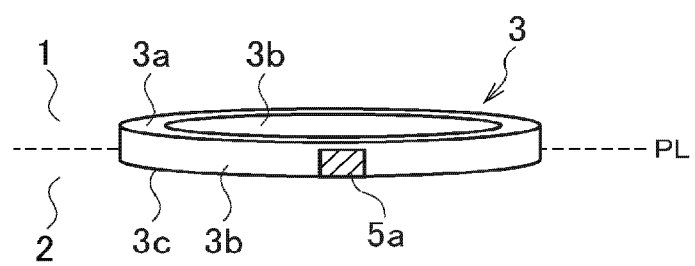
FIG. 7A is a view used to explain a connection position of the resin reservoir on the side surface of the cavity.
Figure 7B:
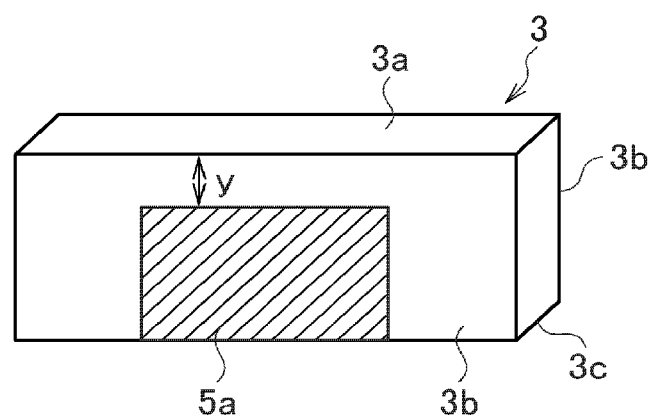
FIG. 7B is a view used to explain the connection position of the resin reservoir on the side surface of the cavity.

Further, an appearance defect due to the generation of the weld line 8 is greatly ascribable to the disorder of the orientation of the luminous material 7 near a surface layer of the upper surface 3a. Therefore, the flows horizontal to the upper surface 3a shown by the arrows X in FIG. 3B and FIG. 3C are desirably generated near the surface layer of the upper surface 3a, and it is more suitable that the positions where the resin reservoirs 5 are connected to the side surfaces of the cavity 3 are nearer to the upper surface 3a. On the other hand, when portions formed by the resin reservoirs 5, 5 are cut after the molding, there is a concern about an appearance defect such as burrs due to a post-process. Therefore, a connection position 5a where the resin reservoir 5 is connected to the side surface 3b of the cavity 3 is set at a position apart from the upper surface 3a by a shortest possible distance y as shown in FIG. 7A and FIG. 7B.

EXAMPLES

Hereinafter, examples where the present invention is applied will be described.

(1) Cavity

The shape of the cavity 3 was a ring shape with a 100 [mm] outside diameter, a 90 [mm] inside diameter, and a 3 [mm] plate thickness as shown in FIG. 1. A gate was the side gate 4 and was provided only at one point on the side surface 3b.

(2) Resin Material

As a base material, PMMA (polymethyl methacrylate) resin was used. As the luminous material 7, an aluminum pigment was used and those with 10 [μm] and 20 [μm] grain sizes were mixed, and the mixture was added so that its content became about 1%.

(3) Resin Reservoirs

The resin reservoirs 5, 5 were connected to the cavity 3 on both sides of the position where the molten resin meets. The effect of alleviating the disorder of the orientation of the luminous material 7 was confirmed, with the volume and the distance y from the upper surface 3a of the reservoirs 5, 5 being varied.

(4) Evaluation Method

Figure 8:
FIG. 8 is a perspective view of the injection mold and is a view showing how an orientation angle of a luminous material is confirmed.

As shown in FIG. 5, an angle of the luminous material 7 to a surface perpendicular to the flow direction of the molten resin (arrows L, R in the drawing) was defined as an orientation angle θ, and the evaluation was made based on this orientation angle θ. As the orientation angle θ of the luminous material 7 is smaller at the meeting part 6, that is, as the orientation angle θ is closer to a right angle to the upper surface 3a, the luminous feeling is lost more and the weld line becomes darker (state in FIG. 4). On the contrary, as the orientation angle θ of the luminous material 7 is larger, that is, as the orientation angle θ becomes more parallel to the upper surface 3a, the luminous feeling is maintained more and the weld line becomes lighter. From visual evaluation, it has been found out that when the orientation angle θ of the luminous material 7 falls within a range of 120° to 180°, the luminous feeling is maintained and the weld line becomes light and inconspicuous. In this example, a ring-shaped injection-molded product was cut at the meeting part 6 along a surface perpendicular to a diameter direction as shown in FIG. 8, this cross-section 3d was observed, and the orientation angle θ of the luminous material 7 was confirmed.

(5) Results

Evaluation results are summarized in FIG. 9.

(5-1) Volume of Resin Reservoir 5

Examples 1 to 3, Comparative Examples 1, 2

In order to alleviate the disorder of the orientation of the luminous material 7 at the meeting part 6, a sufficient amount of the molten resin needs to flow into the resin reservoirs 5, 5. On the other hand, from a viewpoint of a material loss and a mold structure, the volume of the resin reservoir 5 is desirably as small as possible. In the example 1 to 3, the volume of one resin reservoir 5 is set to 0.2 [$cm^3$], 0.6 [$cm^3$], and 23 [$cm^3$] respectively. Further, in the comparative examples 1, 2, the volume [$cm^3$] of one resin reservoir 5 is set to 0 [$cm^3$] (that is, no resin reservoir) and 0.1 [$cm^3$] respectively.

FIG. 10A shows a photograph of the cross section 3d taken in the example 2 and FIG. 10B shows a photograph of the cross section 3d taken in the comparative example 1. It is seen that in the photograph shown in FIG. 10B, many of the orientation angles θ of the luminous material 7 are small, that is, many of the orientation angles θ are close to a right angle to the upper surface 3a. On the other hand, in the photograph shown in FIG. 10A, the disorder of the orientation of the luminous material 7 is alleviated and the orientation angle θ of the luminous material 7 is large. Note that upper parts in FIG. 10A and FIG. 10B are design surfaces of the injection-molded products.

When the volume of one resin reservoir 5 was 0.2 [$cm^3$] or more, the orientation angle θ of the luminous material 7 was 120° or more as shown in FIG. 9, so that the luminous feeling was maintained and the weld line was light and inconspicuous. When the volume of one resin reservoir 5 was over 0.6 [$cm^3$], there was not seen any large difference in the orientation angle θ. From this, it has been found out that, when a cross-sectional area of the cavity 3 at the meeting part 6 is 0.15 [$cm^2$] as in this example, an amount of the molten resin escaping from the side surfaces 3b, 3b is suitably 0.2 [$cm^3$] or more.

When the cross-sectional area of the cavity 3 at the meeting part 6 becomes large due to the shape of the product, a larger amount of the molten resin needs to escape. Referring to the examples 1 to 3, it is seen that, by setting the volume of one resin reservoir 5 to a numerical value 1.4 times a numerical value of the cross-sectional area of the cavity 3 at the meeting part 6 or more, it is possible to alleviate the disorder of the orientation of the luminous material 7 and to suppress an appearance defect due to the generation of a weld line.

(5-2) Position of Resin Reservoir 5

Examples 4, 5, Comparative Examples 3 to 5

As previously described, the flows horizontal to the upper surface 3a shown by the arrows X in FIG. 3B and FIG. 3C are desirably generated near the surface layer of the upper surface 3a, and it is more suitable that the position at which the resin reservoir 5 is connected to the side surface of the cavity 3 is closer to the upper surface 3a. On the other hand, when the structures of the resin reservoirs are cut after the molding, there is a concern about an appearance defect such as burrs due to the post-process. In the examples 4, 5, the distance y of the resin reservoir 5 from the upper surface 3a is set to 0.1 [mm] and 0.2 [mm] respectively. Further, in the comparative examples 3 to 5, the distance y [mm] of the resin reservoir 5 from the upper surface 3a is set to 0.3 [mm], 0.5 [mm], and 0.75 [mm] respectively. Note that in all of the examples 4, 5 and the comparative examples 3 to 5, the volume of one resin reservoir 5 is 0.6 [$cm^3$].

When the distance y of the resin reservoir 5 from the upper surface 3a was 0.3 [mm] or more, the orientation angle θ of the luminous material 7 was below 120° as shown in FIG. 9, so that the luminous feeling was lost and the weld line became dark. From this, it has been found out that, when the plate thickness is 3 [mm] as in this embodiment, setting the distance y of the resin reservoir 5 from the upper surface 3a to less than 10% of the plate thickness is suitable.

Figure 11A:
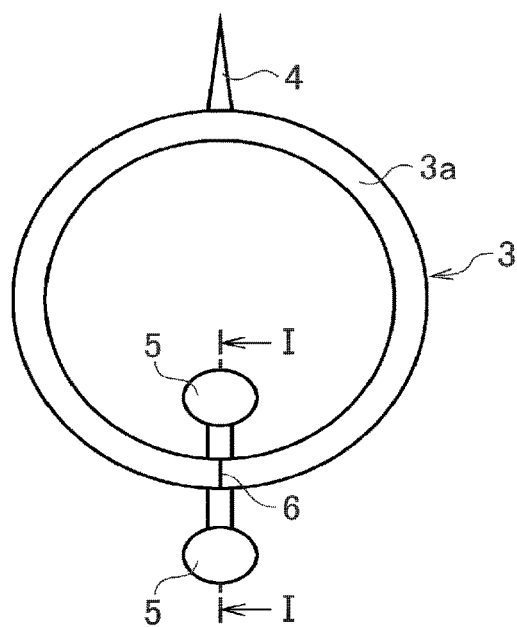
FIG. 11A is a view showing a cavity according to another embodiment.
Figure 11B:
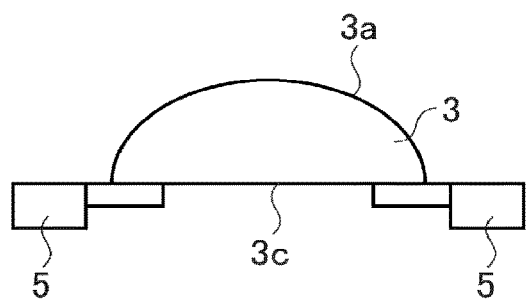
FIG. 11B is a view showing a cavity according to another embodiment.
Figure 11C:
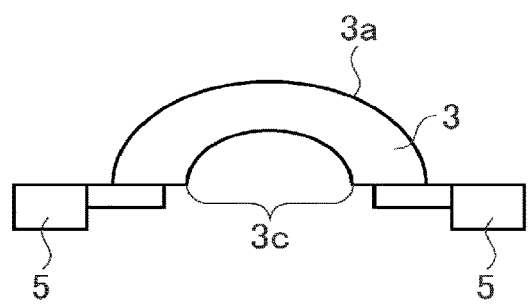
FIG. 11C is a view showing a cavity according to another embodiment.

In the above-described embodiment, the example where the cavity 3 has the rectangular cross-sectional shape is described, but the present invention is also applicable to a case where the cavity 3 does not have any side surface. Another possible shape is that in a cross section of a cavity 3, an upper surface 3a forming a design surface of an injection-molded product has an arc shape and continues from a bottom surface 3c as shown in FIG. 11A to FIG. 11C. In this case, connecting the resin reservoirs 5, 5 to the bottom surface 3c continuing from the upper surface 3a produces the same effects. It should be noted that the resin reservoirs 5, 5 do not necessarily have to be connected to the bottom surface 3c, and when the generation of a weld line on the bottom surface 3c causes no problem, the resin reservoirs 5, 5 can be installed apart from the bottom surface 3c.

The weld line not only appears as a linear pattern but also has irregularities on its surface in some cases. Therefore, in a plated resin part, a weld line sometimes appears on the plating. The present invention is also effective for correcting an appearance defect of a plated resin part.

In the foregoing, the present invention is described along with various embodiments, but the present invention is not limited to these embodiments and changes and so on may be made therein within a scope of the present invention. When the cavity 3 has the ring shape and has a uniform cross-sectional area as in the above-described embodiment, it is obvious that the molten resin meet at the position opposite the side gate 4 in the diameter direction of the cavity 3, but depending on the shape of the cavity 3, the meeting part 6 may be found by, for example, using resin flow analysis software and the resin reservoirs 5, 5 can be disposed on both sides of the found meeting part 6.

According to the present invention, in an injection mold in whose cavity molten resin meets, the molten resin partly flows into resin reservoirs at a position where the molten resin meets, which makes it possible to alleviate the disorder of the orientation of a luminous material to maintain its luminous feeling and to make a weld line light and inconspicuous.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A manufacturing method of an injection molded product using an injection mold in whose cavity molten resin containing an aluminum pigment as a luminous material meets as flowing in opposite directions, the injection mold comprising:
    resin reservoirs which are connected to both sides of the cavity, corresponding to the position where the molten resin meets, and into which the molten resin partly flows,
    wherein the cavity has a cross-sectional shape having a surface forming a design surface of an injection-molded product and both side surfaces continuing from the surface forming the design surface,
    wherein one of the resin reservoirs is connected to one of the side surfaces and the other resin reservoir is connected to the other side surface, across the position where the molten resin meets and
    wherein, when the molten resin partly flows into the resin reservoirs, flow of the molten resin, which is substantially in parallel from the surface forming the design surface to the resin reservoirs, is generated and aluminum pigment makes an orientation angle of 120° to 140° on the surface of the design surface at the position where the molten resin meets.

2. The manufacturing method of the injection molded product according to claim 1, wherein the resin reservoirs are connected to the side surfaces at positions apart from the surface forming the design surface.

3. The manufacturing method of the injection molded product according to claim 1, wherein the cavity has a ring shape in a plane view.

4. A method of manufacturing an injection molded product, comprising the steps of:
    using an injection mold comprising a cavity, an injection end, and a meeting zone, wherein the cavity comprises:
        a first side and an opposite second side;
        a cross-sectional shape comprising a surface forming a design surface of an injection-molded product and both side surfaces continuing from the surface forming the design surface;
    disposing a first resin reservoir to the first side of the cavity and disposing a second resin reservoir to the second side of the cavity at the meeting end;
    injecting a molten resin comprising an aluminum pigment as a luminous material into the cavity at the injection end;
    flowing the molten resin in opposite directions in the cavity so that the opposite flows of the molten resin meet at the meeting zone;
    partly flowing the molten resin into the first and second resin reservoirs, wherein the partial flow of the molten resin is substantially in parallel from the surface forming the design surface to the resin reservoirs; and
    forming an orientation angle of the aluminum pigment of 120° to 140° on the surface of the design surface at the meeting zone.

5. The manufacturing method of the injection molded product according to claim 4, further comprising the step of connecting the resin reservoirs to the side surfaces at positions apart from the surface forming the design surface.

6. The manufacturing method of the injection molded product according to claim 4, wherein the cavity comprises a ring shape in a plane view.

* * * * *